US012683332B2

(12) United States Patent
Garapon

(10) Patent No.: US 12,683,332 B2
(45) Date of Patent: Jul. 14, 2026

(54) DEVICE FOR CONNECTING AN ELECTRICAL CONDUCTOR TO AN ELECTRICAL CONNECTOR, THE DEVICE BEING PROVIDED WITH A VISUAL INDICATOR OF PROPER ASSEMBLY

(71) Applicant: A. Raymond et Cie, Grenoble (FR)

(72) Inventor: Yoann Garapon, Grenoble (FR)

(73) Assignee: A. Raymond et Cie, Grenoble (FR)

( * ) Notice: Subject to any disclaimer, the term of this patent is extended or adjusted under 35 U.S.C. 154(b) by 346 days.

(21) Appl. No.: 18/291,404

(22) PCT Filed: Jun. 9, 2022

(86) PCT No.: PCT/FR2022/051097
§ 371 (c)(1),
(2) Date: Jan. 23, 2024

(87) PCT Pub. No.: WO2023/002097
PCT Pub. Date: Jan. 26, 2023

(65) Prior Publication Data
US 2025/0105559 A1 Mar. 27, 2025

(30) Foreign Application Priority Data
Jul. 23, 2021 (FR) ...................................... 2107981

(51) Int. Cl.
*H01R 13/641* (2006.01)
*H01M 50/50* (2021.01)
*H01R 13/629* (2006.01)

(52) U.S. Cl.
CPC .......... *H01R 13/641* (2013.01); *H01M 50/50* (2021.01); *H01R 13/629* (2013.01)

(58) Field of Classification Search
CPC .... H01R 13/641; H01R 13/629; H01M 50/50
(Continued)

(56) References Cited

U.S. PATENT DOCUMENTS 7,387,537 B1 * 6/2008 Daily ................. H01R 13/6272
439/282
7,416,423 B2 * 8/2008 Chi .................... H01R 13/4538
439/131
(Continued)

FOREIGN PATENT DOCUMENTS

EP 2830162 A1 1/2015
EP 2871695 A1 5/2015
(Continued)

OTHER PUBLICATIONS

International Search Report for Application No. PCT/FR2022/051097 dated Sep. 8, 2022, 2 pages.
(Continued)

*Primary Examiner* — Harshad C Patel
(74) *Attorney, Agent, or Firm* — TraskBritt

(57) ABSTRACT

A device for connecting an electrical conductor to an electrical connector, the electrical conductor being provided with a pair of notches, comprises a lock formed by two arms that are able to be moved away from one another and close back over the second element in order to be accommodated in the notches thereof and to place the lock in the locking configuration. The device comprises a visual locking indicator formed of at least one pattern. The visual locking indicator is entirely exposed only when the lock is in the locking configuration.

20 Claims, 5 Drawing Sheets

(58) Field of Classification Search
USPC ........................................................ 439/345
See application file for complete search history.

(56)                 References Cited

U.S. PATENT DOCUMENTS

| | | | |
|---|---|---|---|
| 8,235,292 B2 | 8/2012 | Talboys | |
| 9,070,939 B2* | 6/2015 | Guen ................. | H01M 50/507 |
| 9,225,116 B2* | 12/2015 | McKibben ........... | H01R 13/645 |
| 9,515,431 B2* | 12/2016 | Kim ....................... | H01R 24/38 |
| 9,698,402 B2 | 7/2017 | Gunther et al. | |
| 9,761,856 B2* | 9/2017 | Kim .................... | H01M 50/503 |
| 10,153,587 B1* | 12/2018 | Lai ...................... | H01R 13/6273 |
| 10,333,117 B2* | 6/2019 | Son ..................... | H01M 50/262 |
| 10,854,860 B2* | 12/2020 | Yamane ............. | H01M 50/227 |
| 11,670,893 B2* | 6/2023 | Horning ............. | H01R 13/6275 |
| | | | 439/346 |
| 11,777,255 B1* | 10/2023 | Choi ...................... | H01R 13/35 |
| | | | 439/106 |
| 12,413,006 B2* | 9/2025 | Li ....................... | H01R 13/4534 |
| 12,562,527 B2* | 2/2026 | Horning ............. | H01R 13/6278 |
| 2017/0263911 A1 | 9/2017 | Gunther et al. | |
| 2018/0294448 A1 | 10/2018 | Yamane et al. | |
| 2022/0071040 A1* | 3/2022 | Horning ............. | H01R 12/7023 |

FOREIGN PATENT DOCUMENTS

| | | |
|---|---|---|
| FR | 3062956 A1 | 8/2018 |
| JP | 2008-034318 A | 2/2008 |
| WO | 2010/049886 A2 | 5/2010 |
| WO | 2019/242917 A1 | 12/2019 |
| WO | 2021/050499 A1 | 3/2021 |

OTHER PUBLICATIONS

International Written Opinion for Application No. PCT/FR2022/
051097 dated Sep. 8, 2022, 6 pages.

* cited by examiner

DEVICE FOR CONNECTING AN ELECTRICAL CONDUCTOR TO AN ELECTRICAL CONNECTOR, THE DEVICE BEING PROVIDED WITH A VISUAL INDICATOR OF PROPER ASSEMBLY

CROSS-REFERENCE TO RELATED APPLICATIONS

This application is a national phase entry under 35 U.S.C. § 371 of International Patent Application PCT/FR2022/051097, filed Jun. 9, 2022, designating the United States of America and published as International Patent Publication WO 2023/002097 A1 on Jan. 26, 2023, which claims the benefit under Article 8 of the Patent Cooperation Treaty of French Patent Application Serial No. FR2107981, filed Jul. 23, 2021.

TECHNICAL FIELD

The present disclosure relates to a connection device for electrically connecting a terminal of a battery module to an electrical conductor. This conductor can make it possible to electrically connect several modules to one another. The present disclosure finds a very particular application in the field of electric vehicles.

BACKGROUND

In high-voltage electrical energy storage systems, in particular, those used in electric vehicles, it is common to combine several battery cells to form individual battery modules. Each module usually comprises two posts or terminals having different poles. The battery modules are connected to one another, that is to say placed in electrical contact with one another via a busbar, generally made of copper.

Usually, a busbar is screwed or soldered to the terminals of the modules that it connects, which is not always suitable for high manufacturing volume.

Known from documents WO2019242917 and U.S. Pat. No. 10,333,117 are connecting devices assembling a busbar to a terminal by simple snap-on connection. However, these devices have no means to confirm the proper locking of the connection. It is therefore not possible, in particular, on an automated assembly line, to easily detect whether the connections between the busbar and the terminals are correctly made.

It is thus desirable to have a connection device provided with a visual indicator of proper assembly.

An object of the present disclosure is to propose a device for connecting an electrical connector to a terminal that is simple to use and provided with a visual indicator of proper assembly.

BRIEF SUMMARY

With a view to achieving this aim, the object of the present disclosure proposes a connection device for connecting an electrical conductor to an electrical connector. The connection device comprises:

a housing defining an internal recess wherein the electrical connector is located, the housing having an opening to allow the insertion of the electrical conductor into the internal recess and its contact with the electrical connector;

a lock arranged partially in the housing, the lock comprising a first arm and a second arm, the two arms respectively comprising two upper portions arranged at the opening and capable of moving away from one another in order to close on notches of the electrical conductor and place the lock in the locking configuration wherein the upper portions of the first arm and of the second arm have a specific separation;

a visual locking indicator formed by at least one pattern arranged on at least one of the upper portions of the arms of the lock, the visual locking indicator being entirely exposed only when the lock is in the locking configuration and the two arms have the specific separation.

According to other advantageous and non-limiting features of the present disclosure, either individually or in any technically feasible combination:

the housing is formed by two parts that can be assembled to one another;

the housing comprises a guide groove of the upper portions of the first and of the second arm;

the upper portions of the first and second arms are respectively associated with flexible return branches;

the housing comprises two secondary compartments configured respectively to accommodate the flexible return branches of the first and second arm;

each upper portion is provided with a separation stop configured to be inserted into a notch of the electrical conductor;

each upper portion of the arms also comprises a contour part combine to define at least a portion of a passage making it possible to insert the electrical conductor into the opening;

the contour parts overlap one another in at least one concealed area when the electrical conductor is not inserted into the connection device;

at least one pattern is arranged on the concealed area;

the connection device comprises two patterns combining to form a code detectable by a reading device;

the code comprises at least one detection marker exposed only when the lock is in the locking configuration;

the code is a QR code.

BRIEF DESCRIPTION OF THE DRAWINGS

Other features and advantages of the present disclosure will emerge from the following detailed description of example embodiments of the present disclosure with reference to the appended figures, in which.

DETAILED DESCRIPTION

Figure 1:
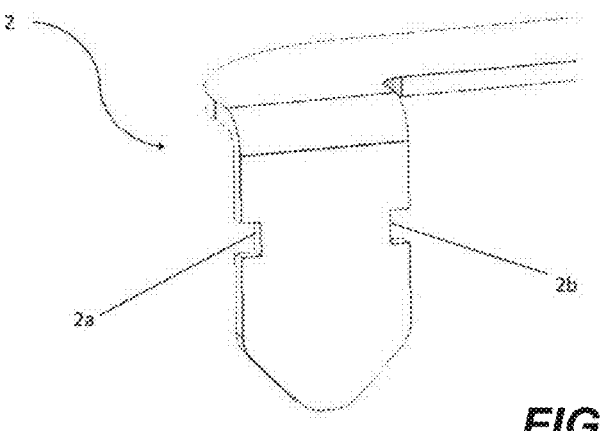
FIG. 1 shows an example of a second part compatible with the connection device according to the present disclosure.

The subject matter of the present description relates to a connection device 100 for connecting an electrical conductor 2 to an electrical connector 1. The electrical conductor 2 may be the end of a busbar, and the connection device 100 may be associated with a terminal of a battery module. As can be seen clearly in FIG. 1, the electrical conductor 2 is provided with a pair of notches 2a, 2b. The notches are arranged opposite one another, so that the electrical conductor 2 has, at the notches, a cross-section of reduced size. The electrical conductor 2 has a chamfered end to facilitate its insertion into the connection device 100 and cause the gradual separation of the arms of a lock intended to engage in the notches 2a, 2b to lock the connection, as will be further detailed in the rest of this description.

General Description of the Connection Device

Figure 2:
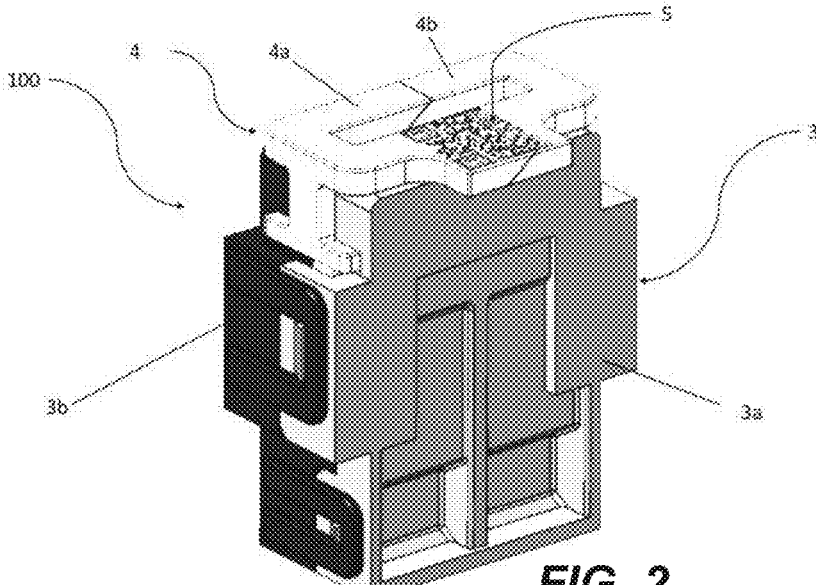
FIG. 2 shows an overall view of a connection device according to the present disclosure.
Figure 3:
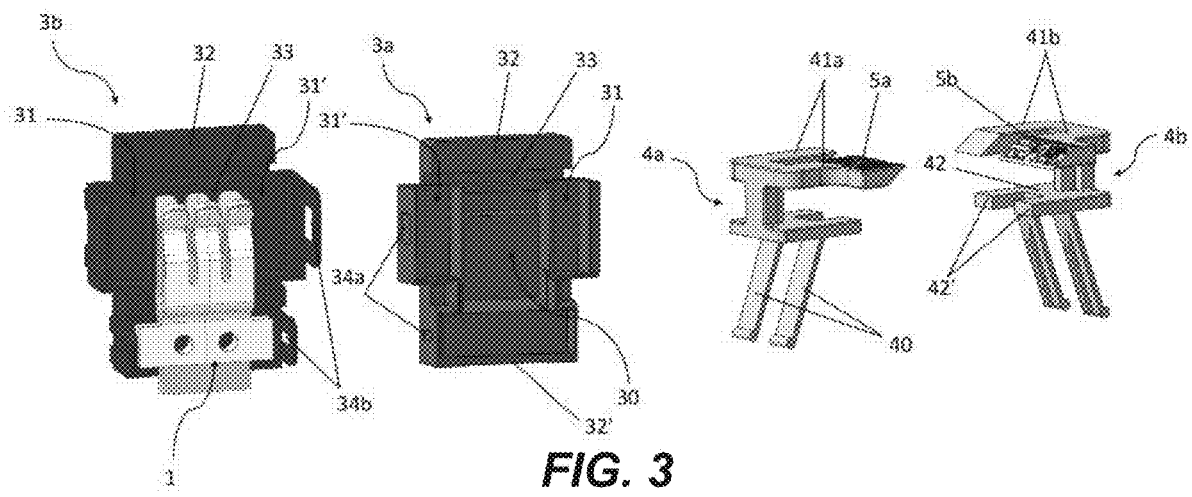
FIG. 3 shows an exploded view of a connection device according to the present disclosure.

FIGS. 2 and 3 respectively show an overall view and an exploded view of a connection device 100 according to one embodiment. FIG. 2, in particular, shows the connection device 100 in a so-called "delivery" configuration. The connection device 100 is formed by a housing 3 defining an internal recess wherein the electrical connector 1, a lock 4 arranged partially in the housing 3 and a visual locking indicator 5 carried by the lock 4 are located.

In the embodiment shown, the electrical connector 1 is formed by a plurality of pairs of flexible blades (3 pairs of flexible blades on the electrical connector 1 of FIG. 1), the blades of a pair of blades facing one another. The electrical connector 1 is assembled to the terminal of the battery module, here by screwing, and is retained in a connector compartment of the internal recess of the housing 3. The electrical connection between the electrical conductor 2 and the electrical connector 1 is obtained by inserting the electrical conductor 2 into the space defined between the flexible blades of the pairs of blades. The flexible nature of the blades of the electrical connector 1 makes it possible to maintain an electrical contact between the two elements.

The housing 3 has an opening 32 opening onto the internal recess 30 to allow the electrical conductor 2 to be inserted and plugged into the electrical connector 1, that is to say its electrical contact with this connector. The housing 3 is advantageously formed of an insulating material such as a plastic material.

The role of the lock 4 is to retain the electrical conductor 2 assembled to the housing 3 and to the electrical connector 1. The lock 4 is formed by a first arm 4a and a second arm 4b. Each arm consists of an upper portion associated with two flexible return branches 40. The upper portions are arranged at the opening 32 of the housing 3. In the delivery configuration, shown in FIG. 2, the upper portions of the lock arms define a passage for inserting the electrical conductor 2 into the opening 32 of the housing 3. The two flexible return branches 40 are respectively arranged in two secondary compartments of the inner recess of the housing 3.

The upper portions are able to move away from one another to close on notches 2a, 2b of the electrical conductor 2 and place the lock 4 in the locking configuration. In this configuration, the upper portions of the first arm 4a and of the second arm 4b have a specific separation.

The visual locking indicator 5 is formed by at least one pattern 5a, 5b arranged on at least one of the upper portions of the arms 4a, 4b, the indicator being entirely exposed only when the lock is in the locking configuration. Apart from this configuration, the locking indicator 5 can be concealed, at least in part. Advantageously, and as shown in the figures, the visual indicator is formed of two complementary patterns 5a, 5b respectively arranged on the upper portions of the arms 4a, 4b of the lock 4. These two patterns 5a, 5b form a visual code, here a QR code, interpretable only when the lock 4 is in the locking configuration, that is to say when the upper portions of the first arm 4a and of the second arm 4b have the specific separation.

It will be recalled that a QR code has a plurality of detection markers (3 markers in the standardized version of this code) which make it possible to quickly identify the presence of this code in a pattern and its orientation. The markers are located at the three corners of the pattern and allow a scanner to recognize the code with precision.

In the context of the present description, it will be found that when the connection device 100 is in the locking configuration, the locking indicator 5 is "complete." In other words, in this configuration, the detection markers are visible and arranged relative to one another so that the code is detectable by a scanner or any other reading device. It is thus possible to detect automatically and reliably the locking state of the connection of the connection device 100. Apart from the locking configuration, the two patterns 5a, 5b cannot be interpreted. In the embodiment shown, the upper portions of the lock arms overlap in the delivery position, so that a portion of the patterns 5a, 5b carried by these arms, and, in particular, at least one of the detection markers, is not entirely visible so that the exposed part of the patterns 5a, 5b cannot be decoded.

Of course, the locking indicator 5 does not necessarily correspond to a QR code. More generally, the pattern(s) 5a, 5b that comprise the indicator 5 can correspond to any code, such as a one-dimensional barcode (for example, UPC code, EAN code, Code 39, Code 128, ITF, Code 93, Codabar, GSI databar, MSI Plessey, etc.), a two-dimensional barcode (for example, QR code, datamatrix code, PDF417, AZTEC, etc.), a holographic code, a human-readable alphanumeric code, other codes known in the art and interpretable by a machine equipped with a viewing device and/or an operator. It may also be a simple pattern, a color, a reflective material or any other shape of marker making it possible to be visually detected.

In a very general manner, therefore, the locking indicator 5 is complete when it can be recognized and thus indicate that the device is indeed in the locking configuration.

Description of the Connection Device:

The housing 3 is formed from a first part 3a and a second part 3b that can be assembled together, for example, by snap-on. To this end, each part is provided with closure elements 34a, 34b, here a detent 34a/slot 34b system. Properly closed, the housing 3 defines an internal recess 30 on which a housing opening 32 emerges, through which the electrical conductor 2 is intended to be inserted. The housing 3 also comprises a secondary opening 32' that opens into the connector compartment and makes it possible to accommodate the terminal of the battery module.

The configuration of the housing in two parts facilitates the assembly of the electrical connector 1 and the arms 4a, 4b of the lock 4 in order to form the connection device 100.

The housing 3 also comprises at least one guide groove 33 in which the upper portions of the arms of the lock engage. In this configuration, the upper portions can slide in the guide groove 33 and move away from or toward one another. The guide groove is oriented substantially perpendicular to the direction of insertion of the electrical conductor 2 into the housing. This guide groove 33 prevents any movement of the lock 4 other than separating the arms of the lock and bringing their upper portions closer together.

In the embodiment shown, the internal recess comprises two secondary compartments 31, 31' configured to respectively accommodate the flexible return branches 40 of the first and second arms 4a, 4b. Located in their secondary compartments and bearing against the walls of the housing 3, the flexible return branches 40 make it possible to hold the upper portions of the lock arms brought together in the delivery configuration, in the absence of any force tending to separate the two upper portions from one another.

Each upper portion of an arm 4a, 4b of the lock 4 takes the form of a jaw intended to close on the notches of the electrical conductor. The bottom of the jaw forms a separation stop 42 on which the end of the electrical conductor 2 is able to bear during its insertion into the connection device 100. This bearing causes the separation of the upper portions of the arms 4a, 4b when the insertion of the electrical conductor 2 through the opening 32 of the housing 3 is continued in order to connect it to the electrical connector 1. The connection device 100 is configured so that the separation stops 42 are inserted into the notches 2a, 2b of the electrical conductor 2 when the end of this electrical conductor 2 is properly inserted into the electrical connector 1 located in the recess of the housing 3. The lock 4 is thus placed in the locking configuration. In this configuration, it is impossible to remove the electrical conductor 2 from the electrical connector 1 unless the upper portions of the arms are manually separated from one another to free the separation stops 42 from the notches 2a, 2b.

The connection device 100 is dimensioned to impose a specific separation on the upper portions of the arms 4a, 4b when the lock 4 is in the locking configuration and thus to reveal the locking indicator 5. When this indicator is composed of several patterns 5a, 5b, they combine to form an entire visual code in the locking configuration.

The separation stop 42 carried by a lock arm 4a, 4b forms the bottom of the jaw consisting of two guides 42' intended to be housed in the guide grooves 33 of the housing 3.

The upper portions of the arms 4a, 4b also comprise a contour part 41a, 41b, combining to define at least a portion of the passage making it possible to insert the electrical conductor 2 into the opening 32 of the housing 3. The contour parts 41a, 41b are not disposed in the recess of the housing when the arms 4a, 4b are suitably assembled to this housing to form the connection device 100, but surround the opening. When the electrical conductor 2 is not inserted into the connection device 100, that is to say in the delivery configuration of this device, the contour parts 41a, 41b overlap one another. A portion of one of the contour parts, referred to as "concealed area," therefore lies in another portion of the other contour part. The contour parts 41a, 41b can thus have complementary bevels that overlap at the concealed areas in the delivery configuration as shown in the figures.

At least one pattern 5a, 5b forming the locking indicator 5 is arranged on a concealed area of one of the contour parts 41a, 41b. In this way, in the delivery position, the visual locking indicator is not entirely visible. When several patterns 5a, 5b are present, they combine to form an entire visual code in the locking configuration only, that is to say when the upper portions of the first arm 4a and the second arm 4b have the specific separation, exposing the concealed zones.

In the embodiment shown, the patterns 5a, 5b form complementary portions of a QR code, at least one marker for detecting this code being arranged on a concealed area of the contour parts 41a, 41b.

Implementation of the Connection Device

Figure 4A:
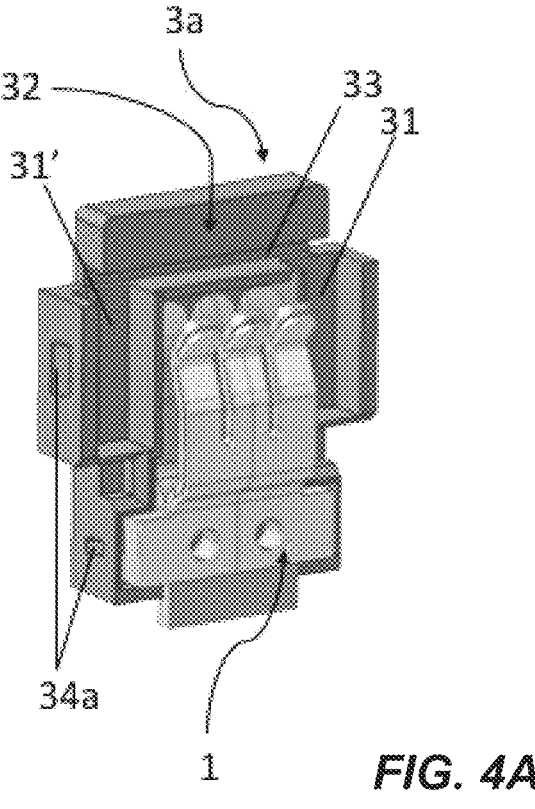
FIGS. 4A to 4D show the different preassembly steps of the connection device according to the present disclosure.
Figure 4B:
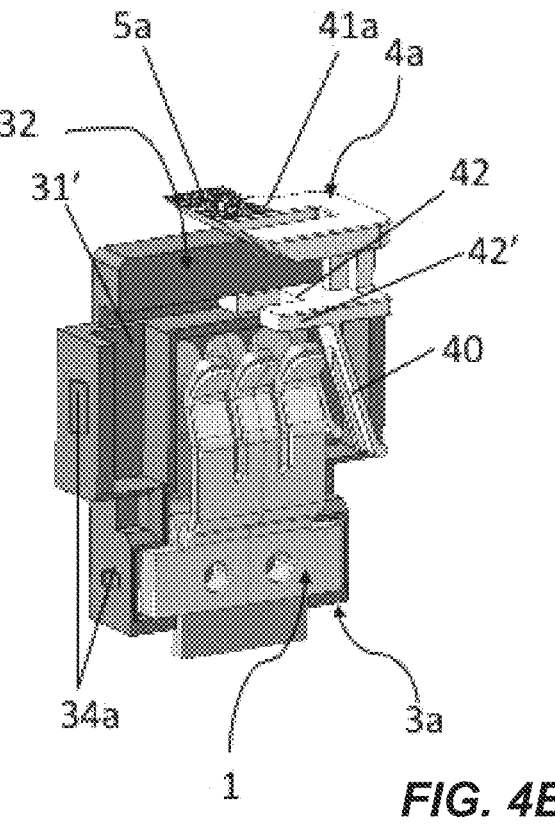
Figure 4C:
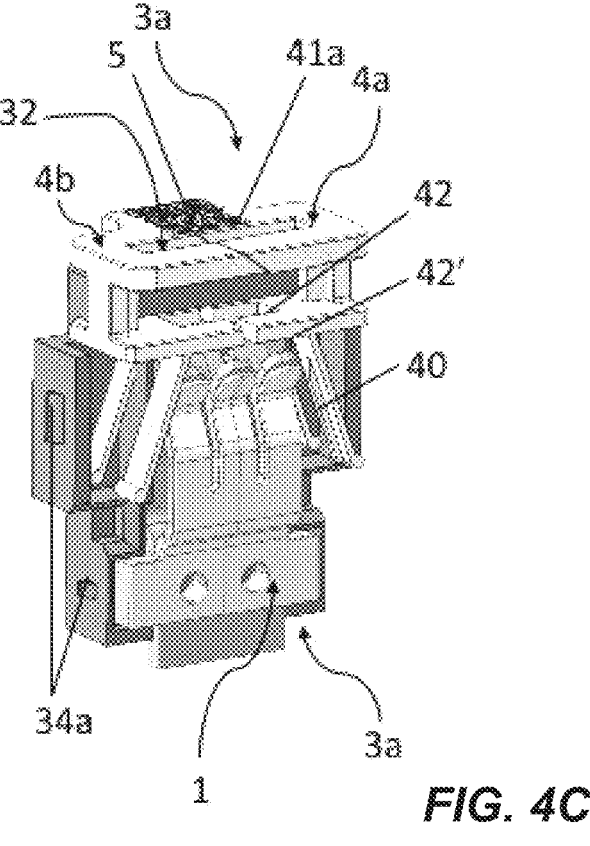
Figure 4D:
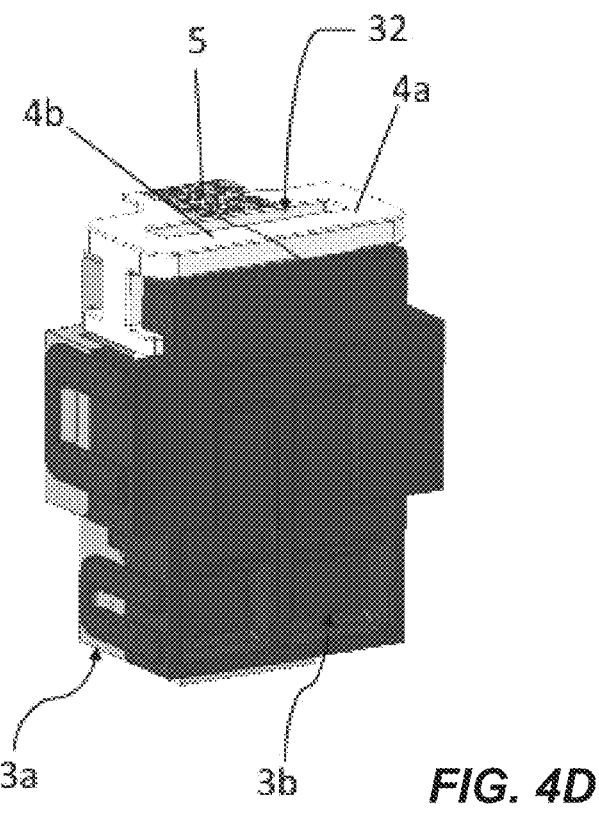

During a step of pre-assembling (FIGS. 4A to 4D) of the connection device 100, the arms 4a, 4b of the lock 4 and the connection device 100 are arranged in the internal recess 30 of the first part 3a of the housing 3. More particularly, the flexible return branches 40 of each arm 4a, 4b are respectively arranged in one of the secondary compartments 31, 31' and the guides 42' are placed in the guide groove 33 (FIGS. 4B and 4C). Then the second part of the housing 3 is assembled by snapping onto the first part 3a, the closure element 34b of the second part being inserted into the closure elements 34a of the first part 3a (FIG. 4D).

In the absence of the electrical conductor 2, the contour parts 41a, 41b are held overlapping one another thanks to the spring effect of the flexible return branches 40. In this delivery configuration, a portion of the pattern 5b carried by the second arm 4b is covered by the first arm 4a and the visible portion of the patterns 5a, 5b does not form a locking indicator 5, here an interpretable QR code.

Figure 5A:
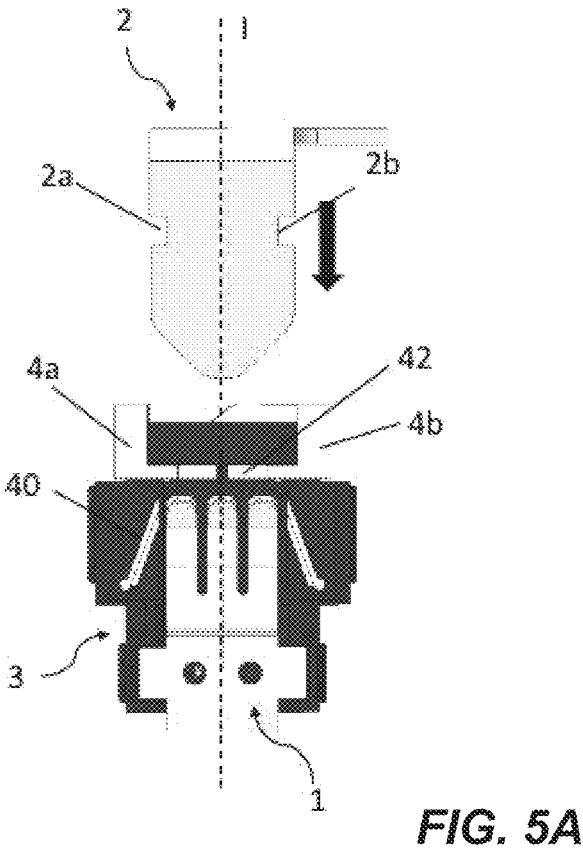
FIGS. 5A to 5D show, according to a cross sectional view, the various steps of assembling an electrical connector to a terminal via a connection device according to the present disclosure, these figures also illustrating, for each of these steps, a zoom view in cross-section at the contact branches of the lock as well as a top view of the locking indicator.
Figure 5B:
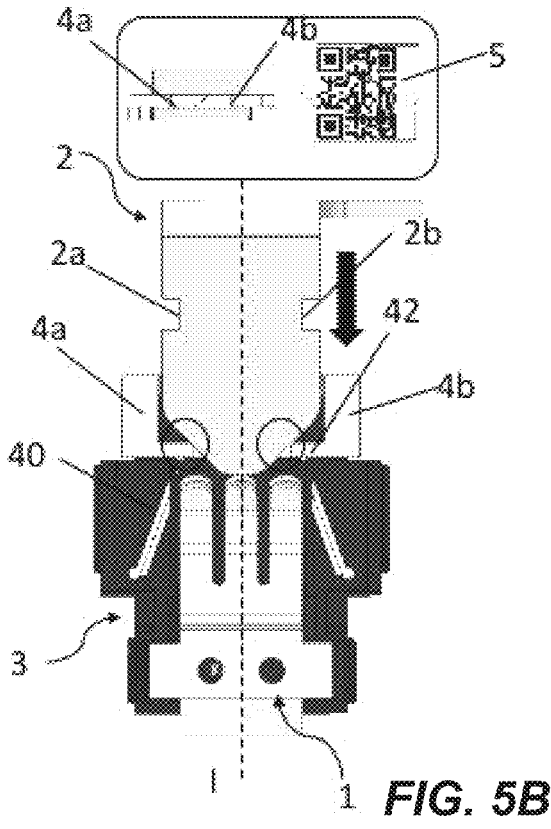
Figure 5C:
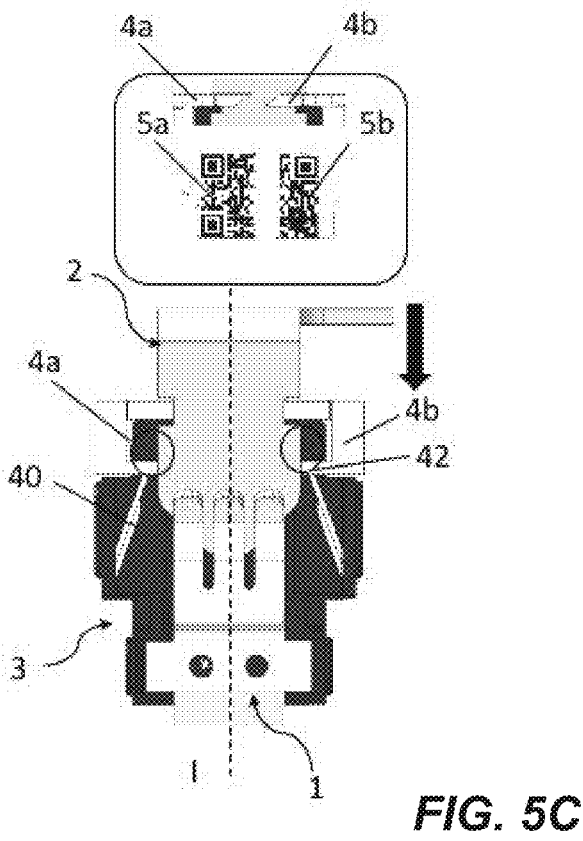
Figure 5D:
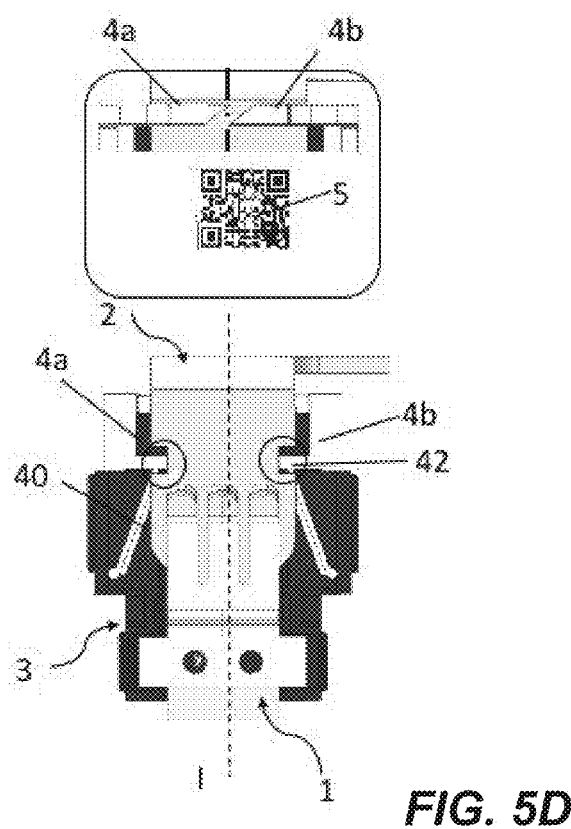

In a subsequent assembly step, the electrical conductor 2 is inserted along an insertion axis I through the opening 32 of the housing 3. The chamfered end of the electrical conductor 2 (see the circled areas in FIGS. 5B to 5D) gradually forces the separation of the arms 4a, 4b of the lock 4 by bearing against the separation stops 42 and is inserted between the flexible blades of the electrical connector 1. The flexible return branches 40 deform to allow the separation of the upper portions of the two arms of the lock 4 (FIG. 5C).

On completion of the assembly step, the electrical conductor 2 is engaged in the electrical connector 1 and the separation stops 42 are closed onto the notches 2a, 2b of the electrical conductor 2. In this locking configuration, the separation stops 42 impose a specific separation on the contour parts 41a, 41b of the lock 4 exposing the patterns 5a, 5b so that the patterns form a readable QR code (FIG. 5D) indicating the state of proper locking of the connection between the electrical conductor 2 and the terminal.

If it is desired to disconnect the electrical conductor 2 from the connection device 100, it is sufficient to apply a separation force on the upper portions of the lock arms 4a, 4b. The separation stops 42 of the notches 2a, 2b are released in order to release the electrical conductor 2 and allow its extraction from the housing 3.

Of course, the present disclosure is not limited to the embodiment described and variant embodiments can be added thereto without departing from the scope of the invention as defined by the claims.

The invention claimed is:

1. A connection device for connecting an electrical conductor to an electrical connector, the connection device comprising:

a housing defining an internal recess wherein the electrical connector is located, the housing having an opening to allow insertion of the electrical conductor into the internal recess and contact of the electrical conductor with the electrical connector;

a lock arranged in part in the housing, the lock comprising two arms including a first arm and a second arm, the two arms respectively comprising two upper portions arranged at the opening and able to be moved away from one another to close on notches of the electrical conductor and place the lock in a locking configuration wherein the upper portions of the first arm and the second arm have a specific separation; and a visual locking indicator formed by at least one pattern arranged on at least one of the upper portions of the arms of the lock, the visual locking indicator being entirely exposed only when the lock is in the locking configuration and the two arms have the specific separation.

2. The connection device of claim 1, wherein the housing is formed by two parts that can be assembled together.

3. The connection device of claim 2, wherein the housing comprises a guide groove for the upper portions of the first arm and the second arm.

4. The connection device of claim 3, wherein the upper portions of the first arm and the second arm are respectively associated with flexible return branches.

5. The connection device of claim 4, wherein the housing comprises two secondary compartments configured to respectively accommodate the flexible return branches of the first arm and the second arm.

6. The connection device of claim 5, wherein each upper portion includes a separation stop configured to fit into a notch of the electrical conductor.

7. The connection device of claim 6, wherein each upper portion of the two arms further comprises a contour part combining to define at least part of a passage allowing the electrical conductor to be inserted into the opening.

8. The connection device of claim 7, wherein, when the electrical conductor is not inserted into the connection device, the contour parts overlap one another at least at one concealed area.

9. The connection device of claim 8, wherein the at least one pattern is arranged on the concealed area.

10. The connection device of claim 9, wherein the at least one pattern comprises two patterns, the two patterns combining to form a code detectable by a reading device.

11. The connection device of claim 10, wherein the code comprises at least one detection marker that is only exposed when the lock is in the locking configuration.

12. The connection device of claim 11, wherein the code is a QR code.

13. The connection device of claim 1, wherein the housing comprises a guide groove for the upper portions of the first arm and the second arm.

14. The connection device of claim 1, wherein the upper portions of the first arm and the second arm are respectively associated with flexible return branches.

15. The connection device of claim 14, wherein the housing comprises two secondary compartments configured to respectively accommodate the flexible return branches of the first arm and the second arm.

16. The connection device of claim 1, wherein each upper portion includes a separation stop configured to fit into a notch of the electrical conductor.

17. The connection device of claim 1, wherein each upper portion of the two arms further comprises a contour part combining to define at least part of a passage allowing the electrical conductor to be inserted into the opening.

18. The connection device of claim 17, wherein, when the electrical conductor is not inserted into the connection device, the contour parts overlap one another at least at one concealed area.

19. The connection device of claim 18, wherein the at least one pattern is arranged on the concealed area.

20. The connection device of claim 1, wherein the at least one pattern comprises two patterns, the two patterns combining to form a code detectable by a reading device.

* * * * *